D. A. McCONNELL.
CLOSURE FOR THRESHING MACHINES.
APPLICATION FILED AUG. 5, 1908.

1,038,926.

Patented Sept. 17, 1912.

Witnesses
L. B. James
C. P. Parker

Inventor
David A. McConnell,
By Herrick Herrick & Kent
Attorneys

UNITED STATES PATENT OFFICE.

DAVID A. McCONNELL, OF THORNTON TOWNSHIP, BUFFALO COUNTY, NEBRASKA.

CLOSURE FOR THRESHING-MACHINES.

1,038,926.  Specification of Letters Patent.  Patented Sept. 17, 1912.

Application filed August 5, 1908. Serial No. 447,030.

*To all whom it may concern:*

Be it known that I, DAVID A. MCCONNELL, a citizen of the United States, residing at Thornton township, in the county of Buffalo and State of Nebraska, have invented certain new and useful Improvements in Closures for Threshing-Machines, of which the following is a specification.

This invention relates to threshing machines, and it has for its object to provide a novel adjunct to the cylinder and concave part of the machine.

In threshing machines as now generally constructed the cylinder and the concave frequently become clogged, and individual teeth and other parts are broken, and great difficulty is then experienced in cleaning out and repairing the parts, for the reason that such parts are difficult of access.

The present invention has for its object to overcome these disadvantages by providing a construction whereby access to the cylinder and concave may be easily had, said construction embodying a readily detachable door which also serves as a conveyer board for the grain which is detached from the heads by the action of the cylinder and concave and which drops through the concave upon the inner surface of said door or board.

The invention further consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
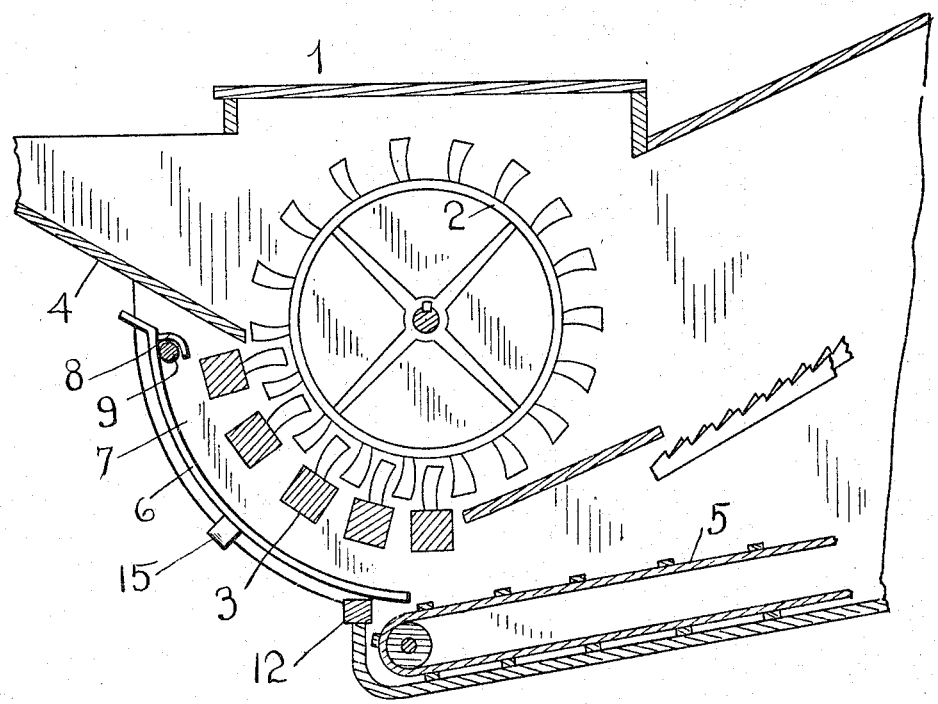
Figure 2:
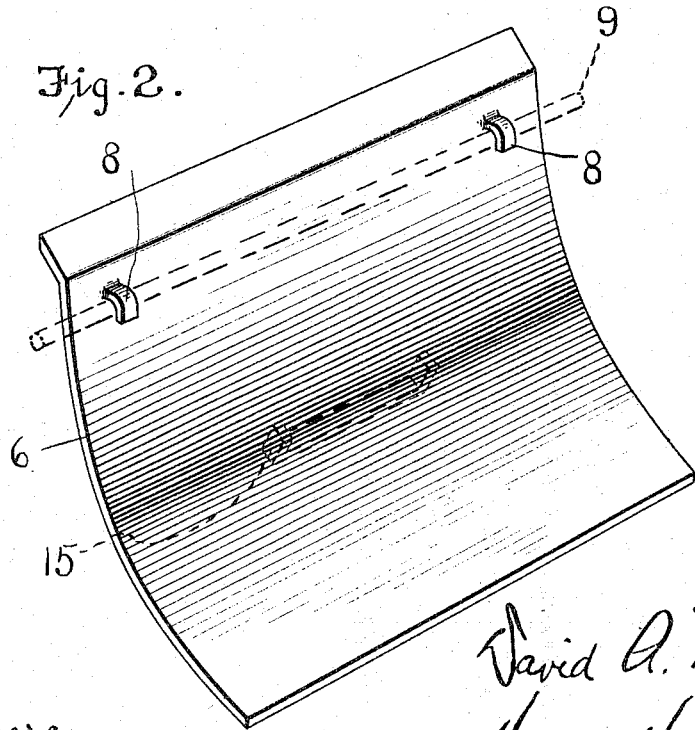

In the drawing,—Figure 1 is a longitudinal vertical sectional view taken through the front part of a threshing machine constructed in accordance with the invention including the cylinder and the concave. Fig. 2 is a perspective view of the detachable closure member which is a part of the invention, the supporting part of the same being shown in dotted lines.

Corresponding parts in both figures are denoted by like characters of reference.

The front end of the casing of the threshing machine, as shown at 1, contains the cylinder 2 and the concave 3 both of which are in the main of ordinary construction, as well as the feed board 4 over which grain is fed between the cylinder and concave. An endless carrier or conveyer 5, which is mounted in an inclined position, extends forwardly beneath the cylinder and the concave, and it terminates directly in rear of a cross bar 12 that extends between the side walls of the casing one of which appears at 7. The space between the sides of the casing, the cross bar 12 and the feed board 4 is left open and unobstructed for the reception of the detachable closure member to be presently described, a cross brace or rod 9 being, however, mounted beneath the feed board and just in front of the upper front portion of the concave. A closure member 6 is provided, the same consisting of a door of arcuate form which is provided near its upper edge with rearwardly extending hooks 8 adapted to engage the rod or brace 9. The door member is made of such shape as to conform with the curvature of the concave, being approximately concentric with the axis of the threshing cylinder, and it may be of such dimensions that when placed in position the lower portion thereof will rest upon and be supported by the cross bar 12 of the casing, the lower edge of the door member being arranged to overlie the front end of the conveyer 5, as clearly seen in Fig. 1 of the drawing. The door member is provided with a handle 15 whereby it may be easily and conveniently manipulated to remove or to replace the same, as may be needed.

When the door or closure member 6 is in position, as shown in Fig. 1, it constitutes a grain board upon which the loose grain passing through the concave will drop and over which it will be directed on to the conveyer 5. Should it be desired to inspect or to repair either the cylinder or the concave, the door member 6 may be removed by slightly lifting it to disengage the hooks 8 from the rod 9, thus affording access to the interior of the casing.

Having thus described the invention, what is claimed as new, is:—

1. A casing having an opening, a cross bar at the lower edge of the opening, and a cross brace adjacent to the upper edge of the opening, in combination with a door or closure consisting of a curved plate having straight upper and lower edges, said door being concave on its inner side and convex on its outer side and provided at its upper edge with an outturned flange, said door being also provided on its inner face adjacent to the upper edge thereof with downturned hooks adapted to engage the cross brace of the casing when the lower portion of the door is supported on the cross bar at the lower edge of the opening in the casing, and said door having at its outer convex side a handle whereby it may be manipulated.

2. A door or closure of the character described consisting of a curved plate having straight upper and lower edges and arcuate side edges, said door being concave on its inner side and convex on its outer side and provided at its upper edge with an outturned flange, said door being also provided on its inner face adjacent to the upper edge thereof with downturned hooks, and said door having on its outer convex side a handle whereby it may be manipulated.

In testimony whereof I affix my signature, in presence of two witnesses.

DAVID A. McCONNELL.

Witnesses.
W. L. HAND,
E. J. VAN VORST.